J. F. L. BAKER.
STAY BOLT.
APPLICATION FILED APR. 25, 1921.
1,411,261. Patented Apr. 4, 1922.
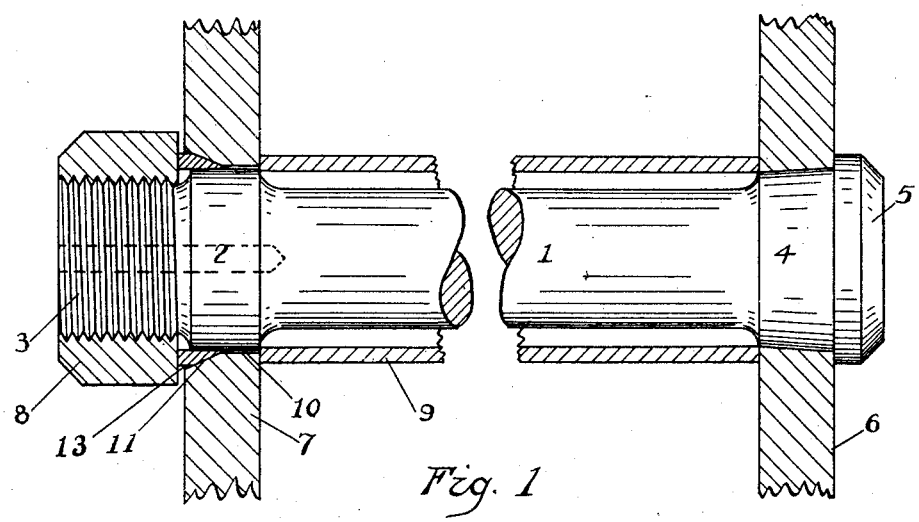
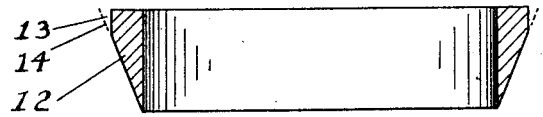
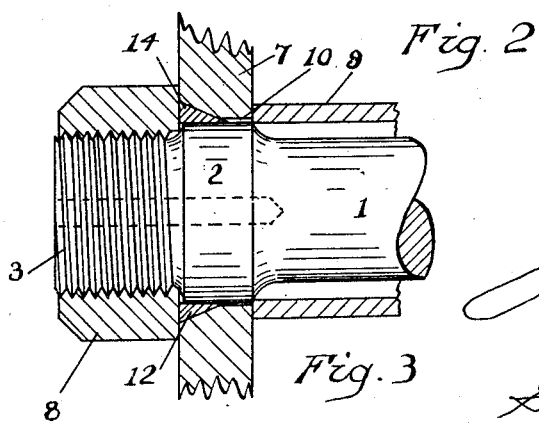
John F. L. Baker
INVENTOR
BY
Geo. R. Willey
ATTORNEY

UNITED STATES PATENT OFFICE.

JOHN F. L. BAKER, OF SAGINAW, MICHIGAN, ASSIGNOR TO THE WICKES BOILER COMPANY, OF SAGINAW, MICHIGAN, A CORPORATION OF MICHIGAN.

STAY BOLT.

1,411,261.

Specification of Letters Patent.

Patented Apr. 4, 1922.

Application filed April 25, 1921. Serial No. 464,390.

*To all whom it may concern:*

Be it known that I, JOHN F. L. BAKER, a citizen of the United States, residing at Saginaw, in the county of Saginaw and State of Michigan, have invented certain new and useful Improvements in Stay Bolts; and I do hereby declare the following to be a full, clear, and exact description of the invention, such as will enable others skilled in the art to which it appertains to make and use the same.

This invention relates to stay-bolts and pertains more particularly to boiler stay-bolts adapted for reinforcing flat surfaces such as the plates that form the walls of the steam and water legs of water tube boilers.

An object of my invention is to provide a stay-bolt so constructed that it can be quickly and easily applied to the plates of a boiler without the necessity of internally screw-threading the stay-bolt holes that receive the threaded stay-bolts heretofore employed.

Another object is to provide a stay-bolt so constructed that the greater the pressure tending to separate the plates, the greater will be the gripping or tightening action of the stay-bolt on the respective plates.

A further object is to provide tapered or conical joints between the stay-bolt and both plates, the tapers in the opposing plates being in opposite directions and the stay-bolt adapted to be readily assembled in place in the oppositely tapered openings of the two plates.

A still further object is to provide a compressible tapered ring adapted to surround one end of the stay-bolt and fitting between the stay-bolt and the tapered orifice in the plate, the compressible ring adapted to be forced into place and held by the stay-bolt nut, the ring forming a tapered and compressed joint between the stay-bolt and the walls of the tapered opening in the plate.

With the foregoing and certain other objects in view which will appear later in the specification, my invention comprises the devices described and claimed and the equivalents thereof.

My invention is illustrated in the accompanying drawings, in which Fig. 1 is a part sectional view of a stay-bolt according to my improved construction, the bolt being shown applied to the leg of a water tube boiler.

Fig. 2 is an enlarged sectional view of the compressible conical ring shown in Fig. 1.

Fig. 3 is a fragmentary sectional view, showing the stay-bolt nut and compressible ring in their tightened positions.

As is clearly shown in the drawings, the device consists in the stay-bolt body 1 formed with an enlarged turned part 2, preferably cylindrical or approximately cylindrical. The end 3 of the body near the turned part 2 is threaded. The end 4 of the stay-bolt, which in practice is the end inside the boiler, and which I term the inner end of the bolt, is enlarged and tapered and may, if desired, be formed with an enlarged head 5.

6 represents the inner plate or sheet of a boiler, as for example, the tube plate of the water leg of a water tube boiler, and 7 is the outer plate. The space between the sheets 6 and 7 may represent any space under pressure, as for instance a water space or a steam space of the boiler. 8 is a threaded nut and 9 is a tubular thimble or spacer that separates the sheets 6 and 7 against the tension of the bolt 1 when the nut 8 is tightened.

The tapered end 4 of the stay-bolt fits a correspondingly tapered aperture drilled and reamed in the plate 6. The angle of the taper preferably corresponds to what is known as a No. 5 Morse taper.

The cylindrical enlarged part 2 of the stay-bolt enters an opening 10 drilled through the plate 7, the outer part 11 of opening 10 being preferably counterbored or tapered to receive a compressible conical ring 12, which may be made of soft metal, as copper. The conical ring 12 is adapted to fit the tapered wall 11 of the opening 10 and to be forced into place by the tightening of nut 8, thereby forming a metallic packed tapered joint between the stay-bolt and the plate 7.

The ring 12 is preferably tapered for a part only of its length, there being a substantially straight cylindrical part 13 at the large end of the ring, whereby an annular clearance space is left between the outer rim of the ring and the inner tapered wall of the opening 11 in the plate, as indicated by the projected dotted line 14 of Fig. 2. This clearance space permits the ring when forced by nut 8 into the V-shaped annular space between the tapered wall 11, and the cylindrical part 2 of the stay-bolt, to spread and completely fill the clearance space. Nut 8, while compressing the ring, is screwed down from its clearance position of Fig. 1 to its tightened position, Fig. 3.

The bolt may be drilled longitudinally at its outer end as shown by the dotted lines in Fig. 1, to form an opening for the escape of water or steam in case the bolt breaks. This opening is commonly specified in standard boiler codes as a required feature of stay-bolt construction.

The stay-bolt assembly is made by first placing the thimble 9 to register with the tapered openings of plates 6 and 7, then passing the stay-bolt through the opening of plate 6 until the enlarged tapered end 4 fits into the tapered opening of plate 6. The enlarged cylindrical part 2 of the stay-bolt is then within the opening 11 of plate 7. The tapered end 4 of the bolt may then be tightly seated in the conical opening of plate 6 by driving with a sledge upon head 5.

The tapered ring 12 is then slipped over the end 3 of the bolt and entered, as shown in Fig. 1, in the annular tapered space between the wall of the opening 11 and the rim of the enlarged part 2 of the stay-bolt. The nut 8 is then tightened until it seats on plate 7. In seating, the nut squeezes the compressible metal of the ring, causing the metal to fill the clearance at 13, and form a compact annular wedge that serves the same purpose as the tapered part 4 of the stay-bolt.

Having thus described my invention, what I claim and desire to secure by Letters Patent is:

1. A stay-bolt comprising a bolt body formed with an enlarged tapered end and a threaded end, a substantially cylindrical enlarged member on said bolt adjacent said threaded end, an exteriorly tapered ring adapted to receive said enlarged member, and a nut on said threaded end adapted to engage said ring.

2. A stay-bolt comprising a bolt body formed with an enlarged tapered end and a threaded end, a substantially cylindrical enlarged member on said bolt adjacent said threaded end, an exteriorly tapered ring of compressible material adapted to receive said enlarged member and a nut on said threaded end adapted to engage the end of said compressible ring, for the purposes set forth.

3. In combination, a pair of plates having oppositely tapered openings, a thimble between said plates, a stay-bolt body formed with an enlarged tapered end fitting the tapered opening of one of said plates, the end of said body threaded, a substantially cylindrical enlarged member formed on said bolt adjacent said threaded end and received in the tapered opening of the other of said plates, an exteriorly tapered ring of compressible material adapted to receive said enlarged member, and a nut on the threaded end of said bolt, adapted to engage the end of said compressible ring.

4. A stay-bolt including a bolt body having a threaded end, a substantially cylindrical enlarged member on said bolt adjacent said threaded end, an exteriorly tapered ring of compressible material received on said enlarged member, and a nut on said threaded end adapted to engage said ring.

In testimony whereof, I affix my signature.

JOHN F. L. BAKER.